United States Patent

Hollstein, Jr.

[15] 3,653,062

[45] Mar. 28, 1972

[54] INFORMATION STORAGE RECORDING SIGNAL AMPLITUDE CONTROL

[72] Inventor: Carl P. Hollstein, Jr., San Jose, Calif.

[73] Assignee: International Business Machines Corporation, Armonk, N.Y.

[22] Filed: Dec. 11, 1970

[21] Appl. No.: 97,363

Related U.S. Application Data

[63] Continuation of Ser. No. 770,171, Oct. 24, 1968, abandoned.

[52] U.S. Cl. ...............346/74 M, 179/100.2 P, 340/174.1 B, 340/174.1 G

[51] Int. Cl. .....................G11b 5/02, G11b 5/44, G11b 5/82

[58] Field of Search ...........................340/174.1 G, 174.1 B; 346/74 M; 179/100.2 P

[56] References Cited

UNITED STATES PATENTS 2,239,042 4/1941 Kleber ...........................340/174.1 G 2,901,737 8/1959 Stovall ...........................340/174.1 B 2,982,822 5/1961 Bacon ...........................179/100.2 P 3,430,215 2/1969 Krossa ...........................340/174.1 B

*Primary Examiner*—Howard W. Britton

*Attorney*—Hanifin & Jancin

[57] ABSTRACT

Apparatus which compensates for certain recording characteristics of a magnetic disk file by varying the amplitude of the recording signal supplied a magnetic transducer. The plurality of concentric tracks of a disk are arbitrarily considered as being divided into groups or bands. Logic means responds to the address of the track being written to determine the position of the head among the predetermined bands of tracks and to accordingly control the amplitude of the recording signal by increasing the write current as the outermost band of tracks is neared and reducing the write current as the center-most band of tracks is neared.

5 Claims, 2 Drawing Figures

INVENTOR.
CARL P. HOLLSTEIN, Jr.

BY John H. Holcombe
ATTORNEY

INFORMATION STORAGE RECORDING SIGNAL AMPLITUDE CONTROL

This application is a continuation of application Ser. No. 770,171, filed Oct. 24, 1968, and now abandoned.

BACKGROUND OF THE INVENTION

1. Field of the Invention

The invention relates to information storage systems and more particularly to magnetic disk file recording apparatus.

2. Description of the Prior Art

Magnetic disk files employing movable heads which may be positioned at a desired one of a plurality of circular concentric recording tracks are rapidly gaining favor as a low cost, high capacity type of data storage apparatus. The low cost of the shared head disk file is the result of employing a single head or transducer to communicate by writing and reading with each track on one surface of a disk. The transducer is moved radially across the base of the disk to select one of the tracks for communication therewith.

Such shared-head disk files employed with data processing systems increasingly require very high data densities in order to store a large amount of information in a given space. To attain such high densities, the data is recorded at higher and higher frequencies, causing the bits to be very close together. For ease of communication with the data processing systems, magnetic disk files are designed for only one data rate, or frequency of operation. Hence, all tracks must be written at the same frequency.

Since each circular track has a different diameter, the tangential speed, or linear velocity, of the disk surface past the head is decreasing toward the inner track. This results in two significant problems.

First, the normal transducer for such disk files is of the air bearing, non-contact type which is supported away from the surface of the disk by an air bearing. The air bearing is created by air which is dragged with the surface of the disk past the transducer. The difference in linear speed between the inner and outer tracks thereby produces different air bearing characteristics, so that the transducer flies or glides at a lower height above the surface at the inner track than at the outer track. The lower height toward the inner track causes the recording flux impressed on the inner track to have a higher amplitude than that impressed on the outer periphery when the same strength signal is supplied the transducer for recording. The higher amplitude of the recording flux causes a lower resolution of the recorded flux transitions. This is because the higher amplitude recording flux affects a much wider area of the recording surface than required. Hence, the recorded flux transitions become blurred or gradual rather than sharp resulting in the effects of "bit shift," discussed hereinafter, and in low amplitude readback signals.

Second, the differences in the relative velocity between the inner and outer tracks also produces increasing pulse density toward the inner track. As the bits arrive closer together in this manner, "bit shift" adversely affects the recorded signals. Bit shift is fully discussed in copending application Ser. No. 733,475, Robert C. Franchini, filed May 31, 1968 and assigned in common with the present application. Briefly, as magnetically recorded bits or transitions are brought closer together, a magnetic read head detects both the transition over which it is immediately passing, and the immediately preceding and following transitions, if they are close to the transition being read. These transitions always alternate in direction, hence, detection of a preceding or following transition subtracts in amplitude from the transition being read. The difficulty arises in that, if only one of the adjacent transitions is close to the transition being read, the subtraction is not symmetrical. Therefore, the detection signal for the transition being read will be reduced on only one side. The peak of the detection signal is thereby effectively shifted away from the closest adjacent transition. This is called "bit shift" or " peak shift." It has been found from practicing the present invention that bit shift can be reduced by reducing the amplitude of the recorded information.

However, in the prior art shared-head disk files, the recording flux amplitudes are higher at the inner track where the data density is also higher, thereby increasing the problems of bit shift.

SUMMARY

An object of the present invention is to provide apparatus for controlling the amplitude of the recording signals supplied the transducer for shared-head magnetic disk files so that the amplitude is lowered as the inner track is approached.

Briefly, the invention comprises an improvement to a magnetic recording system including a disk having a magnetic signal storage surface thereon, motive means operable to rotate the disk about an axis at a constant angular velocity, a magnetic transducer supported away from the magnetic signal storage surface by the flow of a medium therebetween, the medium being propelled by the motion of the surface, positioning means for selectively positioning the magnetic transducer at a selected radial distance from said axis, and a source of signals to be recorded. The improvement comprises apparatus for supplying the signals to the magnetic transducer for recording thereby on the surface including means for providing an indication of the radial distance of the magnetic transducer from the axis, and means for supplying the signals to said magnetic transducer, which means is responsive to the radial distance indication to control the amplitude of the signals so supplied.

DESCRIPTION OF THE PREFERRED EMBODIMENT

Figures 1, 2:
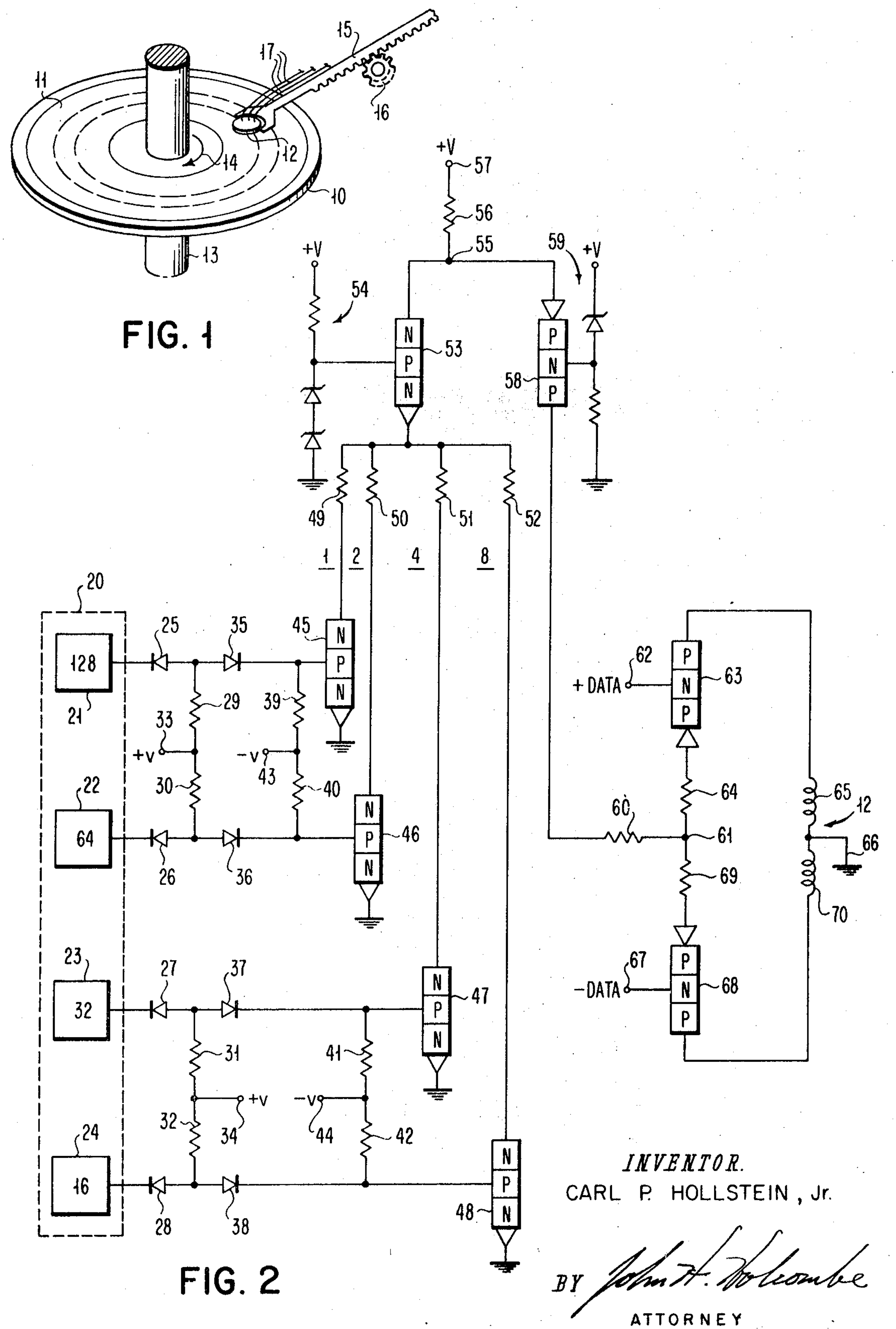
FIG. 1 schematically illustrates a rotating disk storage device having a movable transducer associated therewith.
FIG. 2 diagrammatically illustrates an embodiment of the present invention to be used with the disk storage device of FIG. 1.

Referring to FIG. 1, a magnetic disk file is shown including a disk 10 having a magnetizable coating 11 on one face thereof, and a magnetic transducer 12. A motor attached to spindle 13 rotates the disk about the axis of the spindle in arrow direction 14 at a constant angular velocity. The transducer 12 is movable radially inward and outward relative to the axis of spindle 13 by a positioning mechanism comprising a rack 15 and pinion 16. By rotating pinion 16, the transducer 12 can be brought into alignment with any selected one of a plurality of concentric circular recording tracks of the magnetic surface 11. The transducer 12 functions in a conventional and well-known manner to record signals supplied on wires 17 on the track being scanned by the transducer. The transducer also functions in a conventional and well-known manner to supply through leads 17 an electric pulse responsive to each change in magnetic polarity in the recorded track.

As discussed above, the the data storage apparatus to be compatible with the data processing system, only one data rate, or frequency, is employed. Since each of the circular concentric tracks has a different diameter, the tangential speed of each track past the transducer 12 is different, the velocity decreasing toward the inner track.

The transducer 12 is supported out of contact with the surface 11 by air which is dragged by the surface 11 past the transducer. The difference in the linear velocity of the surface at the inner and outer tracks likewise causes the air dragged thereby to move at different velocities. Therefore, the transducer is supported at a higher distance from the surface at the outer track which is moving at a high linear velocity, whereas the transducer is closer to the surface 11 at the inner track where the air is moving at a slower velocity. The lower height toward the inner track causes the recording flux impressed on the inner track to have a higher amplitude than that impressed on the outer track when the same strength signal is supplied to the transducer 12 for recording.

Additionally, the differences in the relative velocity between the inner and outer tracks result in an increasing pulse density toward the inner track. As discussed above, this crowding of the bit pulses toward the inner track results in the adverse effects of bit shift. The effects of bit shift can be reduced, it has been found, by reducing the amplitude of the recorded information.

However, in the prior type of disk file, the effects of bit shift increased toward the inner track and the flying height is also reduced toward the inner track, thereby increasing the amplitude of the recording flux. Hence, the effects of bit shift are severely aggravated toward the inner track of the prior art disk file.

As shown in FIG. 2, the present invention employs circuitry responsive to the address of the track at which transducer 12 is positioned to thereby control the amplitude of recording current supplied to the transducer.

For example, in the apparatus shown in FIG. 1, approximately 200 tracks appear on the surface 11 of disk 10. The positioning mechanism (which will not be described in detail) operates in response to a binary coded track address contained in a track address register 20. The track address register contains eight binary-weighted positions. The high order binary positions 21–24 of the register are used to subtract a current that is proportional to the register value from the maximum current used on the outside tracks. The voltage output of each of the positions of the register varies from 0 volts when a binary 0 is in the register position to a positive voltage when a binary 1 is present in the register position. The outputs from the register positions are connected via diodes 25–28 and resistors 29–32 to positive voltage supplies 33 and 34. One terminal of each of the resistors 29–32 is connected via diodes 35–38 and resistors 39–42 to negative supply terminals 43 and 44. One terminal of each of the three resistors 39–42 is also connected to the base of switching transistors 45–48. The emitter of each of the transistors is connected to ground and the collectors thereof are each connected respectively to a resistor 49–52. The resistors have binary weighted resistances, i.e., resistor 49 may have a binary weight of 1, resistor 50 may have a binary weight of 2, resistor 51 may have a binary weight of 4, and resistor 52 may have a binary weight of 8. The resistors are all connected in parallel to the emitter of transistor 53. The base of the transistor 53 is connected to circuitry 54 which is arranged to control the voltage of the base despite slight variations in the power supply. The collector of transistor 53 is connected to terminal 55 and thereby via resistor 56 to power supply 57.

The presence of 1's in various positions 21–24 of the track address register 20 will cause switching on of corresponding ones of transistors 45–48 and thereby insert corresponding ones of resistances 49–52 in parallel to ground. Connecting selected resistances to ground draws current through transistor 53 from terminal 55 and thereby conducts current from the current source 56, 57 to ground. The higher order value of a position in register 20 which contains a 1 places a lower resistance in the parallel circuitry. Hence, greater current will be directed through those resistances to ground, thereby subtracting from the current which is supplied to the transducer 12.

The remaining current from the terminal 55 is supplied to the transducer 12 by being directed to the emitter of transistor 58. The base of transistor 58 is connected to circuitry 59, which controls the voltage across the base-emitter of transistor 58 and thereby across resistor 56 despite variations in the power supply voltage. This causes terminal 55 to be the output of a current source. The collector of transistor 58 is connected via resistor 60 to terminal 61. The current therethrough is then directed under the control of the incoming data along either of two paths.

The first path is under the control of plus incoming data at terminal 62 which is connected to the base of transistor 63. Terminal 61 is connected via resistor 64 to the emitter of transistor 63. The collector of the transistor is connected to coil 65 of the transducer 12 to a ground terminal 66.

The other path is under the control of minus incoming data at input terminal 67 which is connected to the base of transistor 68. Terminal 61 is likewise connected via a resistor 69 to the emitter of transistor 68. The collector of transistor 68 is connected via coil 70 of transducer 12 to ground terminal 66.

During recording, the signal supplied incoming data terminals 62 and 67 are always of opposite polarity. Hence, only one of the transistors 63 or 68 is on at any one time. The supplied current is thus directed along one of the described paths to generate a magnetic flux in the transducer 12 in either one or the opposite direction to thereby record a signal on the surface of the disk which orients particles of the magnetizable surface of the disk in either one or the opposite direction.

In operation, assume for example that the transducer is first positioned at track 10. Each of the high order positions 21–24 of track address register 20 is therefore in the 0 state. The output voltage from each of the positions is therefore 0 and thereby holds the base of the corresponding transistors 45–48 at 0 voltage, blocking the transmission of any current by resistors 49–52. Hence, the entire current appearing at terminal 55 is directed via transistor 58 to the transducer 12. The recording current is therefore at the maximum value, which is appropriate since track 10 is toward the outer periphery of the disk where the transducer 12 flies at the maximum height from the surface.

As the next example, assume that the transducer is positioned at track 20. The binary position 24, which has a binary significance of 16, therefore now contains a 1. The output of the stage is thus switched to a positive voltage, which voltage is supplied to the base of transistor 48. The transistor 48 thereby connects resistor 52 to ground. The resistor 52 has a binary significance of 8 and thereby drains a small amount of current from terminal 55, via transistor 53 to ground. The remainder of the current is thereby directed to the transducer 12. Hence, as the transducer is moved inwardly slightly its flying height is thereby reduced slightly and the described circuitry compensates by slightly reducing the current supplied to the transducer for recording.

As the next example, assume that the transducer is moved to track 60. Positions 23 and 24 of the track address register therefore both are in the 1 state, operating the associated transistors 47 and 48 to gate resistors 51 and 52 to ground. Since these two resistances are in parallel, the equivalent resistance has a binary significance between 4 and 2. Hence, a greater amount of current is withdrawn from terminal 55 through transistor 53 and the resistors 51 and 52 to ground. The remaining current is again transmitted to the transducer 12.

If now the transducer is moved to track 150, positions 21 and 24 of the track address register will be in the 1 state, turning on transistors 45 and 48. The associated resistors 49 and 52, having binary significances respectively of 1 and 8, therefore are placed in parallel and result in a resistance of binary significance less than 1. Hence, a significant amount of current is bled from terminal 55 through transistor 53 and resistances 49 and 52 to ground. At track 150, the transducer 12 is relatively near the center track of the disk and is flying at a relatively low height. Therefore, the described circuitry compensates by providing only a substantially reduced current to the transducer for recording.

The described circuitry thus divides the entire surface of the disk into bands of 16 tracks each, and reduces the current supplied to the transducer for recording by gating various of the resistors 49–52 in a binary-coded fashion as the transducer is moved toward the center of the disk. Binary stepping thereby compensates both for the reduction in flying height of the transducer and assists in reduction of effective bit shift due to a crowding of the bits.

The described circuitry is the best mode contemplated for use in a commercial type of disk file. However, other circuitry may easily be employed to similarly reduce the current supplied the transducer as the transducer is moved toward the center track. One example is the placing of resistors serially into the circuit from the power supply 57 to the transducer 12 and thereby reduce the supply current by increasing the resistance. Another method is to employ potentiometers to replace the stepped resistance functions.

While the invention has been particularly shown and described with reference to a preferred embodiment thereof, it will be understood by those skilled in the art that foregoing and other changes in form and details may be made therein without departing from the spirit and scope of the invention.

What is claimed is:

1. In a data storage system having a magnetic disk for rotation about an axis, and an air bearing magnetic transducer for radially accessing concentric data tracks defined on said disk, a source of information signals for application to said transducer and for recording on said data tracks, the combination of:

means for selectively positioning said transducer at a data track at a predetermined radial distance from said axis;

means for providing an indication of the radial distance of said magnetic transducer from said axis, comprising a track address register wherein a binary coded track address signal indicative of the transducer predetermined radial position is stored independent of said transducer's actual radial position; and means responsive to said track address signal for controlling the amplitude of the information signals applied to said transducer from said source.

2. In a data storage system as in claim 1, wherein said amplitude controlling means comprises a compensating circuit for reducing the current supplied to said magnetic transducer for recording, as said transducer is moved radially inward towards said rotational axis.

3. In a data storage system as in claim 1, wherein said controlling means comprises:

a source of electric current;

switching means responsive to said indication for controlling the amount of said current from said source supplied to said transducer; and signal means responsive to said source of signals to control the path of said supplied current and thereby control the direction of flux generated by said transducer.

4. In a data storage system as in claim 3, wherein said switching means is responsive to the address signal stored in said track address register.

5. In a magnetic recording system including a disk having a magnetic signal storage surface thereon, motive means operable to rotate said disk about an axis, a magnetic transducer for recording on said magnetic signal storage surface, said transducer being supported away from said surface by the flow of a medium therebetween, said medium being propelled by the motion of said surface, positioning means for selectively positioning said transducer at a selected radial distance from said axis, and a source of signals to be recorded, the improvement thereto comprising;

means for providing an indication of the radial distance of said magnetic transducer from said axis;

means for transmitting said signals from said source of signals to said transducer for recording on said surface, said transmitting means being responsive to said indication for controlling the amplitude of said transmitted signals;

wherein said controlling means comprises:

a source of electric current;

switching means responsive to said indication for controlling the amount of said current from said source supplied to said transducer;

signal means responsive to said source of signals to control the path of said supplied current and thereby control the direction of flux generated by said transducer;

wherein said radial distance indication means comprises a track address register in which is inserted the binary designation of the track at which said transducer is positioned by said positioning means;

wherein said switching means is responsive to the contents of certain predetermined positions of said track address register; and wherein said switching means comprises:

a plurality of binary-weighted resistances having first terminals connected in common and to said source of electric current;

a plurality of switches, each connected to the other terminal of an associated one of said resistances and controlled by the contents of an associated position of said track address register to selectively connect said associated resistance to ground, thereby conducting a selected portion of said current of said source to ground; and supply means for supplying the remainder of said current of said source to said signal means.

* * * * *